(12) United States Patent
Gurney (10) Patent No.: US 10,745,308 B2
(45) Date of Patent: Aug. 18, 2020

(54) SCALE REMOVAL SYSTEM (71) Applicant: LINDE AKTIENGESELLSCHAFT, Munich (DE)

(72) Inventor: Darren Gurney, London (GB)

(73) Assignee: Linde Aktiengesellschaft, Munich (DE)

( * ) Notice: Subject to any disclaimer, the term of this patent is extended or adjusted under 35 U.S.C. 154(b) by 142 days.

(21) Appl. No.: 15/568,848

(22) PCT Filed: Mar. 23, 2016

(86) PCT No.: PCT/EP2016/056466
§ 371 (c)(1),
(2) Date: Oct. 24, 2017

(87) PCT Pub. No.: WO2016/169725
PCT Pub. Date: Oct. 27, 2016

(65) Prior Publication Data
US 2018/0099889 A1 Apr. 12, 2018

(30) Foreign Application Priority Data
Apr. 24, 2015 (GB) .................................. 1506997.4

(51) Int. Cl.
*C02F 5/08* (2006.01)
*B01D 61/02* (2006.01)
(Continued)

(52) U.S. Cl.
CPC .............. *C02F 5/08* (2013.01); *B01D 61/022* (2013.01); *B01D 61/025* (2013.01);
(Continued)

(58) Field of Classification Search
None
See application file for complete search history.

(56) References Cited

U.S. PATENT DOCUMENTS 5,503,735 A * 4/1996 Vinas .................... B01D 61/12
134/111
2012/0255904 A1* 10/2012 Nagghappan .......... E21B 43/34
210/638

(Continued)

FOREIGN PATENT DOCUMENTS

| GB | 2166426 | * | 5/1986 | ............... C02F 5/02 |
| GB | 2509309 | * | 7/2014 | ............... B01D 1/00 |
| JP | H01179803 | * | 7/1989 | .............. F22B 37/52 |

OTHER PUBLICATIONS

English translation JPH01179803, accessed on Sep. 2019. (Year: 1986).*

(Continued)

*Primary Examiner* — Eric W Golightly
*Assistant Examiner* — Arlyn I Rivera-Cordero
(74) *Attorney, Agent, or Firm* — Donald T. Black (57) ABSTRACT

A system for descaling apparatus is described. The system provides for: a water inlet feedstream; a reverse osmosis system in fluid communication with the water inlet feedstream, in which the reverse osmosis system produces a water permeate output feedstream; and a pressurised carbon dioxide feedstream. The pressurised carbon dioxide feedstream and water permeate output feedstream are arranged in use to combine to produce a pressurised carbonic acid input feedstream.

8 Claims, 4 Drawing Sheets

(51) Int. Cl.
- *B01D 61/04* (2006.01)
- *B01D 61/12* (2006.01)
- *B01D 65/02* (2006.01)
- *F28G 9/00* (2006.01)
- *C02F 1/44* (2006.01)
- *C02F 1/66* (2006.01)
- *B01D 63/10* (2006.01)
- *B08B 3/08* (2006.01)
- *C02F 1/28* (2006.01)
- *C02F 103/02* (2006.01)

(52) U.S. Cl.
CPC ......... *B01D 61/027* (2013.01); *B01D 61/04* (2013.01); *B01D 61/12* (2013.01); *B01D 63/10* (2013.01); *B01D 65/02* (2013.01); *B08B 3/08* (2013.01); *C02F 1/283* (2013.01); *C02F 1/441* (2013.01); *C02F 1/442* (2013.01); *C02F 1/66* (2013.01); *F28G 9/00* (2013.01); *B01D 2311/04* (2013.01); *B01D 2311/10* (2013.01); *B01D 2311/14* (2013.01); *B01D 2311/18* (2013.01); *B01D 2311/243* (2013.01); *B01D 2321/162* (2013.01); *C02F 2103/023* (2013.01); *C02F 2209/03* (2013.01); *C02F 2209/05* (2013.01); *C02F 2209/06* (2013.01); *C02F 2301/046* (2013.01); *C02F 2303/22* (2013.01)

(56) References Cited

U.S. PATENT DOCUMENTS

| | | |
|---|---|---|
| 2013/0248445 A1 | 9/2013 | Wang et al. |
| 2015/0330725 A1 | 11/2015 | Gurney |

OTHER PUBLICATIONS

International Search Report for PCT/EP2016/056466, dated May 23, 2016. Authorized Officer: Zoltan Zsigmond, 2 pages.

\* cited by examiner

SCALE REMOVAL SYSTEM

CROSS-REFERENCE TO RELATED APPLICATIONS

This application claims priority under 35 USC § 119 to International Patent Application No. PCT/EP2016/056466, filed on Mar. 23, 2016 which claims priority from Great Britain Patent Application 1506997.4 filed on Apr. 24, 2015.

BACKGROUND OF THE INVENTION

The present invention relates to a scale removal system and a method for removing scale from apparatus, such as for example heat exchanges or condensers. In particular, the present invention relates to a scale removal system comprising a reverse osmosis generated water permeate feedstream and a pressurised carbon dioxide feedstream which combine to form a pressurised carbonic acid feedstream, and a method of using the scale removal system to remove scale deposits from apparatus.

Apparatus, such as for example heat exchangers and condensers, is prone to the build up of scale residue. As scale deposits form on the apparatus the effective cooling capability of the apparatus reduces due to the insulating properties of the scale residue. As a result, the amount of energy used by the apparatus increases. The scale residue must be regularly removed in order for the apparatus to continue to be used efficiently. Conventionally, solutions of strong mineral acids, such as for example sulphuric acid ($H_2SO_4$), are used to remove scale from the apparatus. There are however a number of disadvantages associated with the use of strong mineral acids. The use of strong mineral acids require extreme caution and can potentially corrode the apparatus if the process is not controlled carefully. As a result, the strong mineral acid may further reduce the useful life of the apparatus. The wastewater arising from the descaling process is also a hazardous waste. The wastewater must therefore be neutralised prior to disposal. Furthermore, the wastewater must be handled by a certified carrier and there are therefore significant additional costs associated with the disposal of the wastewater.

During the scale removal process, the apparatus is usually required to be removed from the process line. There are therefore a number of time constraints associated with disassembling the apparatus from the process line and reinstalling the descaled apparatus to the process line.

There is therefore a need for a system and a method for removing scale from apparatus which overcomes one or more of the above problems. In particular, there is a need for a system and a method for removing scale which does not require the use of highly corrosive material. There is also a need for a system and a method for removing scale which does not produce hazardous waste products, such as for example hazardous waste water. There is also a reed for a system and a method for removing scale which does not require water to be neutralised. There is also a need for a system and a method for removing scale which can be used in situ without requiring a process line to be disassembled for scale removal. There is also a need for a system and a method for removing scale which can be used quickly and efficiently.

SUMMARY OF THE INVENTION

According a first aspect of the present invention there is provided a system for descaling apparatus, the system comprising;

a water inlet feedstream;
a reverse osmosis system in fluid communication with the water inlet feedstream, in which the reverse osmosis system produces a water permeate output feedstream; and
a pressurised carbon dioxide feedstream,
in which the pressurised carbon dioxide feedstream and water permeate output feedstream are arranged in use to combine to produce a pressurised carbonic acid feedstream.

According to a second aspect, the present invention provides a method for descaling apparatus, the method comprising:

introducing a water inlet feedstream to a reverse osmosis (RO) system to generate a water permeate feedstream;
combining the water permeate feedstream with a pressurised carbon dioxide feedstream to provide a pressurised carbonic acid feedstream; and
introducing the pressurised carbonic acid feedstream into the apparatus for scale removal.

Any conventional reverse osmosis (RO) system may be used. Reverse osmosis systems are commonly used in the drinking water sector and in industrial water reuse plants. Reverse osmosis (RO) of solvent enables dissolved impurities or contaminants, such as for example inorganic salts, to be removed from a solvent. Typically, the solvent is water, such as for example, sea or brackish water. In some embodiments, the water may be tap water or distilled water. The reverse osmosis system comprises a semi permeable membrane. In use, water is forced through the semi-permeable membrane under high pressure by a membrane pump. The membrane acts as a selective barrier which allows the water to pass through but excludes most impurities and contaminants, e.g., trivalent, divalent and complex ions.

The steps of combining the water permeate feedstream with the pressurised carbon dioxide feedstream and introducing the pressurised carbonic acid feedstream into the apparatus may be simultaneous or may be performed consecutively.

The system may further comprise a carbonic acid storage tank operable to store the carbonic acid for scale removal. The water permeate feedstream and the pressurised carbon dioxide feedstream may be in fluid communication with each other and combine upstream of the carbonic acid storage tank. The water permeate feedstream and the pressurised carbon dioxide feedstream may be combined prior to introduction into the storage tank. The system may therefore comprise a combined feedstream, in communication with each of the water permeate feedstream and the pressurised carbon dioxide feedstream, in communication with the carbonic acid storage tank. Alternatively, the water permeate feedstream and the pressurised carbon dioxide feedstream may each be in fluid communication with the carbonic acid storage tank. As such, the water permeate feedstream may be combined with the pressurised carbon dioxide feedstream within the carbonic acid storage tank.

The water permeate feedstream and the pressurised carbon dioxide feedstream may be combined and introduced simultaneously into the apparatus for scale removal.

The system preferably further comprises a carbon dioxide storage tank in communication with the pressurised carbon dioxide feed stream. The system preferably further comprises an automated injection valve to control the rate and/or quantity of flow of carbon dioxide from the carbon dioxide storage tank through the pressurised carbon dioxide feed stream.

The carbon dioxide is preferably stored within the carbon dioxide storage tank as liquid or as compressed gas.

The term 'descaling' is used herein to refer to the process of removing residual scale deposits, on for example apparatus.

The system preferably further comprises at least one apparatus for descaling. The system may be retro-fitted to a process line comprising at least one apparatus for descaling. For example, the system may further comprise at least one heat exchanger and/or condenser, or any combination thereof, for descaling. The system preferably further comprises at least one apparatus for scale removal in fluid communication with at least one carbonic acid input feedstream. The or at least one apparatus is preferably downstream of and in fluid communication with the carbonic acid storage tank. The system preferably further comprises at least one contaminated carbonic acid output feedstream comprising dissolved scale which has been removed from the at least one apparatus. The or each contaminated carbonic acid output feedstream is preferably in fluid communication with the storage tank and/or the carbonic acid input feedstream prior to introduction into the apparatus. The contaminated carbonic acid output feedstream(s) may therefore be recycled, preferably continuously, through the storage tank and/or carbonic acid input feedstream and the at least one apparatus.

The system preferably further comprises a monitoring system for monitoring one or more operating parameters of one or more feedstreams. The system may include any suitable sensors for determining any operating parameter as determined by the particular requirements of the system. The monitoring system preferably comprises at least one of: a pH sensor, a pressure sensor, and/or a conductivity probe or combination thereof.

The monitoring system is preferably arranged in use to monitor the operating parameter(s) of one or more of: the carbonic acid within the storage tank; the pressurised carbonic acid input feed stream prior to introduction into the apparatus and/or the contaminated carbonic acid output feedstream, and any combination thereof.

The system is preferably arranged such that the pressurised carbonic acid feedstream and contaminated carbonic acid feedstreams are preferably recycled from the storage tank, through the apparatus for descaling and preferably returned to the storage tank. Preferably, the contaminated carbonic acid feedstream is combined with the carbonic acid within the storage tank, and is once again introduced into the apparatus and returned to the storage tank. Preferably, the pressurised carbonic acid feedstream and contaminated carbonic acid feedstream are recycled between the storage tank and apparatus provided the monitored operating parameter(s) are determined to be within the required corresponding predetermined values.

Preferably, the pressure of the pressurised carbonic acid input feedstream measured prior to introduction to the apparatus, i.e. as measured upstream of the apparatus) is in the range of between $3.0 \times 10^5$ pascal (3.0 bar) and $6.0 \times 10^5$ pascal (6.0 bar), more preferably approximately $3.0 \times 10^5$ pascal (3.0 bar). It is however to be understood that the pressure of the pressurised carbonic acid feedstream will depend on the pressure drop through the apparatus.

Preferably, the total dissolved solids (TDS) concentration within the pressurised carbonic acid input feedstream and/or the carbonic acid stored in the tank is in the range of between approximately 70 to 350 mg/l.

Preferably, the conductivity of the pressurised carbonic acid input feedstream and/or the carbonic acid stored within the tank is approximately 10 micro siemens.

Preferably, the pH of the pressurised carbonic acid input feedstream and/or the carbonic acid stored within the tank is in the range of between approximately 4.3 and 8.2; more preferably between approximately 5 and 8; especially preferably between approximately 5 and 7, for example between approximately 5.5 and 6.5.

Preferably, the pressure of the carbonic acid within the storage tank is in the range of between atmospheric to $4.0 \times 10^5$ pascal (4.0 bar), more preferably between approximately $1.0 \times 10^5$ pascal (1.0 bar) and $4.0 \times 10^5$ pascal (4.0 bar), for example approximately $2.0 \times 10^5$ pascal (2.0 bar).

Preferably, the pressure of the contaminated carbonic acid feedstream is in the range of between $1.0 \times 10^5$ pascal (1.0 bar) and $4.0 \times 10^5$ pascal (4.0 bar), preferably $2.0 \times 10^5$ pascal (2.0 bar).

Preferably, the total dissolved solids (TDS) concentration within the contaminated carbonic acid feedstream is in the range of between approximately 800 to 4200 mg/l.

Preferably, the conductivity of the contaminated carbonic acid feedstream is approximately 1300 to 6500 micro siemens.

Preferably, the pH of the contaminated carbonic acid feedstream is in the range of between approximately 5.5 and 6.5. The pH of the contaminated carbonic acid feedstream is in the range of 8.2 to 9.5

The carbonic acid input feedstream is preferably also in fluid communication with the reverse osmosis system. When one or more operating parameters of the carbonic acid input feedstream and/or the carbonic acid within the storage tank and/or contaminated carbonic acid output feedstream is determined to be outside of the corresponding predetermined values then the carbonic acid input feedstream is preferably introduced to the reverse osmosis (RO) system for decontamination.

Preferably, the contaminated carbonic acid output feedstream is in fluid communication with the carbon dioxide feedstream. Additional carbon dioxide feedstream is preferably introduced into one or more of the carbonic acid within the storage tank, and/or the carbonic acid input feed stream and/or the contaminated carbonic acid output feedstream as determined by the monitored operating parameters.

One or more feed stream preferably further comprises at least one automated valve for controlling the rate and/or quantity of flow of feed stream therethrough.

A two-way valve preferably connects the water permeate output feedstream and the contaminated carbonic acid feedstream upstream of the storage tank and/or carbonic acid input feedstream.

The system may comprise one or more heater elements for heating and/or maintaining one or more feedstream and/or carbonic acid within a predetermined operating temperature range. Preferably, the system comprises a heater element in communication with the carbonic acid within the storage tank.

DETAILED DESCRIPTION OF THE INVENTION

With reference to the Figures, the system 100 comprises a water inlet feedstream 1 and a raw water supply pump 2 operable to control the flow rate and pressure of water feedstream 1 into a reverse osmosis (RO) system 5.

The system 100 further comprises a number of pre-treatment stages 4 upstream of the RO system 5. Examples of suitable pre-treatment stages may include one or more of tile following:
1. Solid suspension filters for removing suspended solids within the water inlet feedstream. The solid suspension filters may comprise sand or anthracite filters;
2. Activated carbon filters for removal of free chlorine and organic compounds within the water inlet feedstream;
3. Nano filtration unit to remove colloidal material from the water inlet feedstream; and
4. Anti-scalant dosing and control system with bunded tank and dosing pump to control scale build-up on membranes.

It is however to be understood that the system may not include pre-treatment stages 4 and that the water inlet feedstream 1 may pass directly to the RO system 5.

The RO system comprises at least one RO membrane. The RO system may for example comprise a plurality of RO membranes. Any suitable RO membrane(s) may be used. For example, the RO system may comprise one or more spiral wound membrane units. Spiral wound membrane units are commonly available, and may for example be supplied by companies such as Koch Membrane Systems (Fluid Systems TFC-HR), Axeon (HF4 high flow series), Dow (Filmtec TW30) and Toray (TM series).

Spiral wound membrane units are made from flat sheet membranes, separated by non-membrane separation layers to allow feed water to flow and surround a central hollow core. Raw water inlet feedstream enters one end of the membrane unit and flows under pressure through the membrane into permeate channels and spirals to the central core, and exits as water permeate.

The energy consumption of a conventional reverse osmosis system is typically relatively high at around at around 5 k/m$^3$.

The reverse osmosis system may be arranged to remove impurities or contaminants having a particle size greater than or equal to a predetermined minimum size. For example, the reverse osmosis system may be arranged to remove impurities or contaminants having a particle size greater than or equal to 0.01 microns.

The RO system 5 further comprises a de-scaling dosing and control system in communication with the RO membrane. It is however to be understood that the de-scaling dosing and control system may be provided as a separate component and may not be present as part of the RO system 5. It is also to be understood that the system 100 may not include a de-scaling dosing and control system.

The RO system 5 is in fluid communication with a storage tank 19. A two-way valve 21 is operable to control the flow of feedstream between the RO system 5 and the storage tank 19.

The system 100 further comprises a carbon dioxide storage tank 26. The carbon dioxide storage tank 26 is in fluid communication with the storage tank 19. An injection valve 23 controls the flow of feedstream from the carbon dioxide storage tank 26 to the tank 19. Valve 22 controls the flow of fluid out of storage tank 19.

The system 100 further comprises a monitoring system comprising a pH sensor 8, a pressure sensor and transmitter 9, and a conductivity probe 10 operable to determine operating parameters within the tank 19. Although the Figures illustrate the monitoring system as comprising a pH sensor, a pressure sensor and transmitter, and a conductivity probe it is to be understood that the monitoring system may comprise any number and any combination of suitable components or sensors operable to determine corresponding operating parameters within the storage tank, and is not limited to this specific combination.

The storage tank 19 is in fluid communication with an inlet of the apparatus 28 to be de-scaled. In the illustrated embodiment, the apparatus is a heat exchanger. It is however to be understood that the apparatus 28 may be any suitable apparatus and is not limited to a heat exchanger. The system 100 may for example include a plurality of apparatus in fluid communication with one or more storage tanks. The apparatus may be arranged in parallel with each other or in series within the system of the present invention.

The system further comprises a carbonic acid injection isolation valve 27 operable to control the flow of feedstream from storage tank 19 into the apparatus 28.

The apparatus 28 provides an outlet which is in communication with the storage tank 19. The two-way valve 21 controls the flow of feedstream from the apparatus 28 back to the storage tank.

The tank 19 is also in fluid communication with the raw water inlet supply 1 and the RO system 5. A recycle isolation valve 6 controls the flow of feedstream from the tank 19 into the raw water inlet supply 1.

Figure 1:
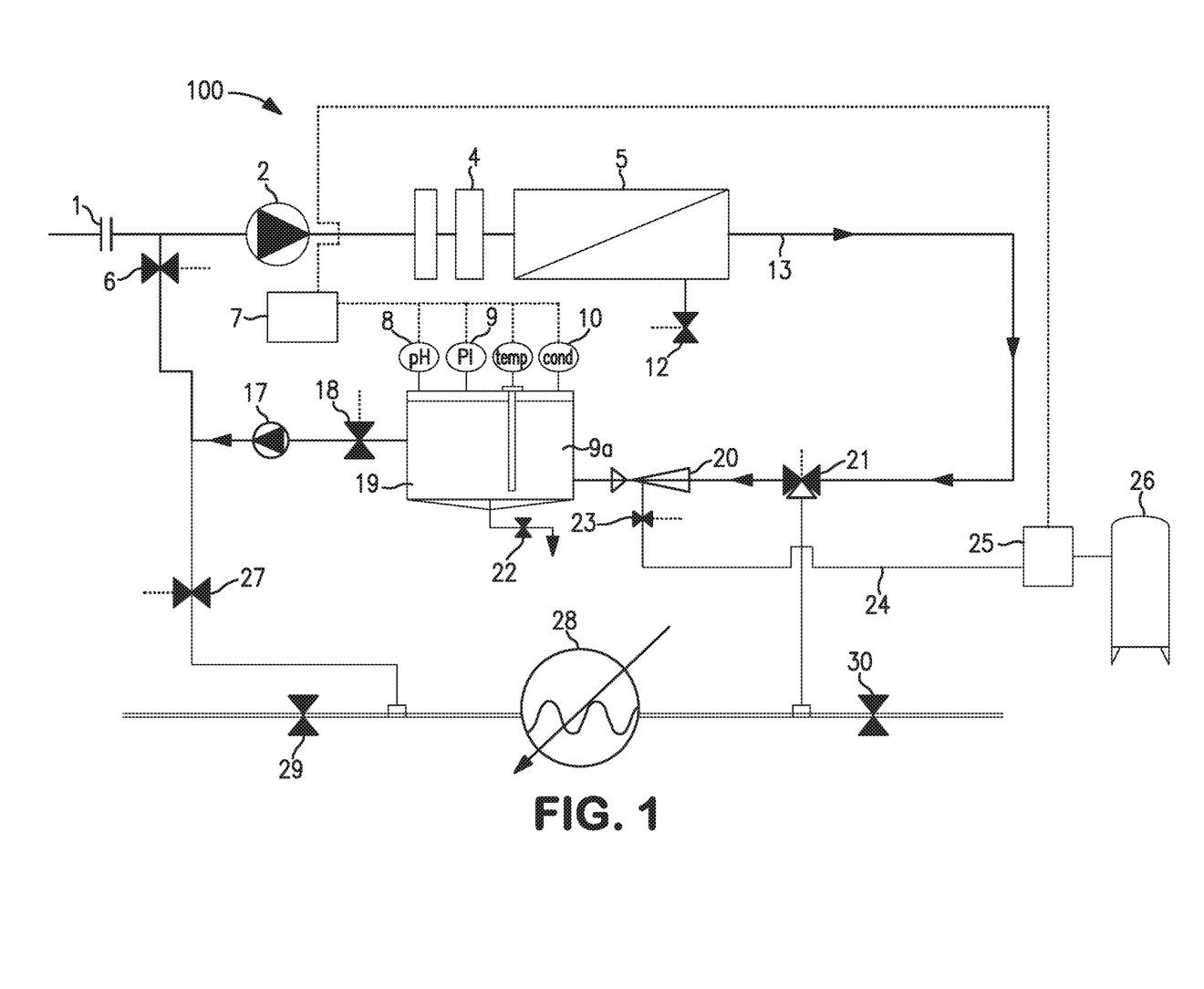
FIG. 1 is a schematic representation of a system according to one embodiment of the present invention for producing reverse osmosis (RO) generated permeate water.

FIG. 1 illustrates the process of producing desalinated water, also referred to herein as water permeate. A raw water inlet feedstream 1 is introduced into the pre-treatment stages 4 of the system. The rate of flow and the quantity of water inlet feedstream 1 introduced into the pre-treatment stages is controlled by raw water supply pump 2. After the pre-treatment stages 4, the water inlet feedstream passes into the RO system 5. It is to be understood that the system 100 may not comprise pre-treatment stages 4 and that the water inlet feedstream 1 may pass directly into the RO system 5.

Figure 5:
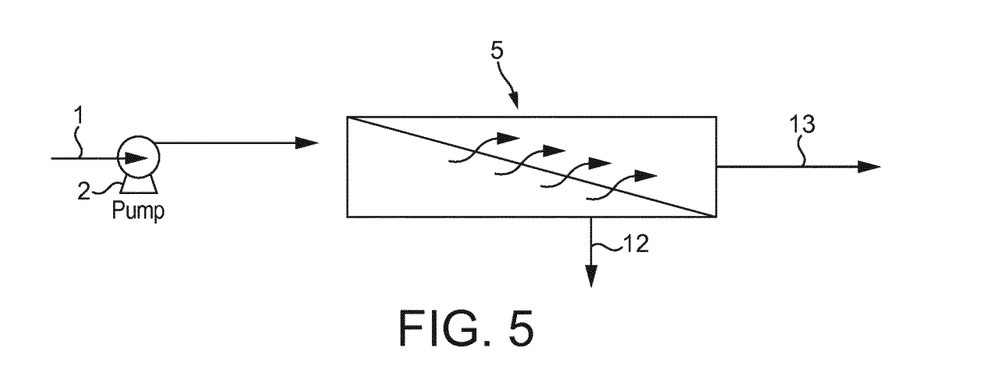
FIG. 5 is a schematic representation of the process of producing demineralised water using an RO system.

The raw water input feedstream 1 passes through the RO system 5 and the dissolved solids in the feedstream 1 are removed in a process known as desalination, as shown in FIG. 5. The water inlet feedstream is forced through a semi-permeable membrane within the RO system 5 in order to remove contaminants and/or impurities so as to produce a water permeate feedstream with higher purity then the initial water inlet feedstream. The water permeate feedstream is also lower in minerals than the initial water inlet feedstream. The semi-permeable reverse osmosis membrane permits the diffusion of ions through it and retains other contaminants and/or impurities. The pressure required to overcome the osmotic pressure of the solution will vary depending on the required degree of demineralisation of the feedstream required.

A high pressure pump 2 increases the pressure on the contaminated side of the RO membrane and forces the "pure" water through the semi-permeable RO membrane, leaving almost all (around 95% to 99%) of the dissolved contaminants and/or impurities such as dissolved salts behind in the reject feedstream 12. The desalinated water that is demineralized or deionized is provided as the water permeate feedstream 13. Typically, about 25% of the volume of the initial water inlet feedstream exits the RO system 5 as reject feedstream 12. The concentration of the contaminants and/or impurities within the reject feedstream is approximately four times the concentration of the contaminants and/or impurities within the initial water inlet feedstream.

The level of performance of the reverse osmosis system depends on one or more of a number of operating parameters, such as for example:
Operating pressure;
Water temperature;
Type and number of total dissolved solids (TDS) present in the solvent phase;
The quality of the filters and membranes used in the RO System; and/or
Number of passes through the membranes.

Typical contaminants and/or impurities removed by a conventional RO system for treating a water supply, and the associated percentage removal range, are shown in Table 1.

TABLE 1

| | |
|---|---|
| Sodium | 85-94% |
| Sulfate | 96-98% |
| Calcium | 94-98% |
| Potassium | 85-95% |
| Nitrate | 60-75% |
| Iron | 94-98% |
| Zinc | 95-98% |
| Mercury | 95-98% |
| Selenium | 94-96% |
| Phosphate | 96-98% |
| Lead | 95-98% |
| Arsenic | 92-96% |
| Magnesium | 94-98% |
| Nickel | 96-98% |
| Fluoride | 85-92% |
| Manganese | 94-98% |
| Cadmium | 95-98% |
| Barium | 95-98% |
| Cyanide | 84-92% |
| Chloride | 85-92% |

% may vary based on membrane type water pressure, temperature & TDS

In a preferred embodiment, the RO system 5 uses cross filtration. The initial water feedstream 1 passes through the membrane, or crosses the membrane filter, with two outlets. The water permeate feedstream 13 exits the system 5 in a first direction, the reject feedstream 12 exits the system in a second opposed direction. To avoid build-up of contaminants on the membrane, cross flow filtration allows water to sweep away contaminant build up on the membrane. Furthermore, cross flow filtration also provides enough turbulence within the water adjacent the membrane to keep the membrane surface clean.

A RO generated water permeate feedstream 13 exits the RO system 5. The RO generated water permeate feedstream 13 has a low pH. Preferably, the pH of the RO generated water permeate feedstream 13 is in the range of approximately pH 7.0 to approximately pH 6.5.

The RO generated water permeate feedstream 13 is substantially free of dissolved solids. For example, the RO generated water permeate feedstream 13 is at least 98%, preferably at least about 99%, more preferably at least about 99.5%, especially preferably at least about 99.9% free of dissolved solids. RO generated water permeate has been found to be an effective solvent for carbonates, metals and most inorganic salts, such as for example calcium carbonate ($CaCO_3$) and calcium oxide ($CaO$).

When in the open position, as shown in FIG. 1, the two-way valve 21 allows the RO generated water permeate feedstream 13 to pass into the storage tank 19.

The carbon dioxide injection valve 23 is opened and pressurised carbon dioxide feedstream 24 flows from the carbon dioxide storage tank 26 and combines with the water permeate feedstream 13 using the gas/liquid contactor 20 just upstream of the storage tank 19. The pressurised carbon dioxide may be introduced as a liquid or as a gas, more preferably as a gas. Although in the illustrated embodiment the pressurised carbon dioxide feedstream 24 and the water permeate feedstream 13 combine upstream of the storage tank 19 it is to be understood that the feedstreams may combine within the storage tank 19.

Figure 4:
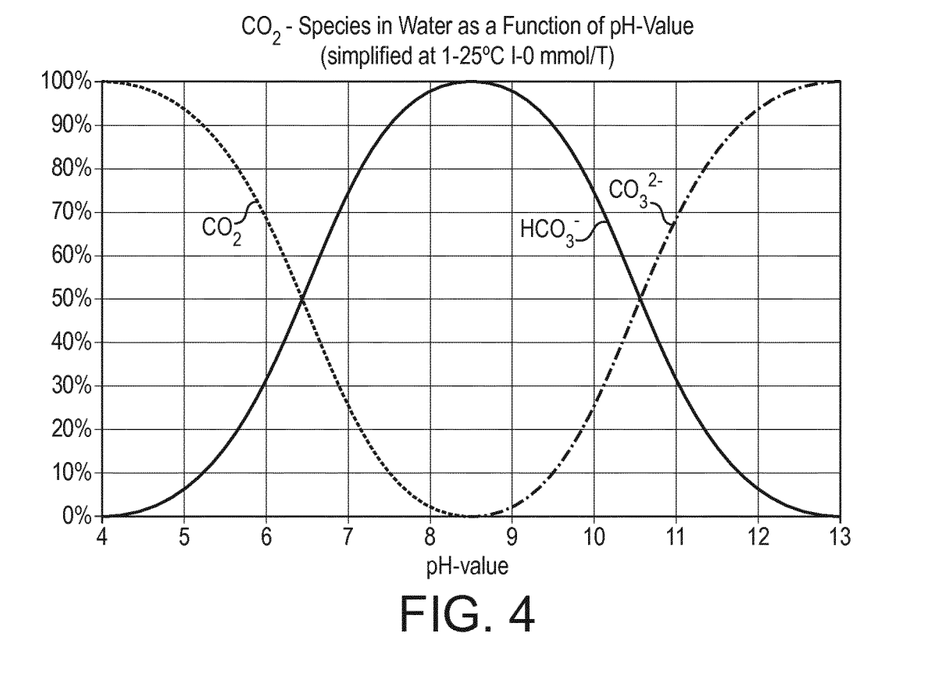
FIG. 4 is a graph representing the relationship between pH and the species of $CO_2$ in water.

In the tank 19, the pressurised carbon dioxide feedstream 24 reacts with the water feedstream 13 to form diprotonic carbonic acid. Diprotonic carbonic acid has the same effect as a weak acid. Diprotonic carbonic acid is unstable and dissociates into hydrogen carbonate ($HCO_3^-$) and carbonate ($CO_3^{2-}$) ions in accordance with its temperature dependent acid constants. The dissociation stages occur at pH values 4.3 and 8.2 (FIG. 4) and are manifested by the buffer effect of the system:

pH<4.3 $CO_2 + H_2O \rightarrow H_2CO_3$ 4.3<pH<8.2 $H_2CO_3 \rightarrow H^+ + HCO_3^-$ pH>8.2 $HCO_3^- \rightarrow H^+ + CO_3^{2-}$ It has been found that by combining pressurised carbon dioxide and RO generated water permeate that the resultant carbonic acid feedstream has increased potential for dissolving mineral scale due to the fact that the feedstream contains more dissolved carbon dioxide to form the carbonic acid complex. The carbonic acid dissociates in water liberating $H^+$ which reacts with the carbonate scale on the apparatus.

The monitoring system is operable to monitor the operating parameters of the carbonic acid within the storage tank 19. The monitoring system is operable to determine whether the carbonic acid feedstream within the tank 19 has operating parameters within a set of predetermined operating parameters which indicate that the carbonic feedstream within tank 19 is suitable for use in removing scale from apparatus.

Suitable operating parameters may include one or more of: pH, pressure and/or conductivity. The carbonic feedstream may be determined to be suitable for use in removing scale from the apparatus if one or more operating parameters are determined to be within a predefined range.

Preferably, the pressure of the pressurised carbonic acid input feedstream (as measured prior to introduction to the apparatus, i.e. as measured upstream of the apparatus) is in the range of between $3.0 \times 10^5$ pascal (3.0 bar) and $6.0 \times 10^5$ pascal (6.0 bar), more preferably approximately $3.0 \times 10^5$ pascal (3.0 bar). It is however to be understood that the pressure of the pressurised carbonic acid feedstream will depend on the pressure drop through the apparatus.

Preferably, the total dissolved solids (TDS) concentration within the pressurised carbonic acid input feedstream and/or the carbonic acid stored in the tank is in the range of between approximately 70 to 350 mg/l.

Preferably, the conductivity of the pressurised carbonic acid input feedstream and/or the carbonic acid stored within the tank is approximately 10 micro siemens.

Preferably, the pH of the pressurised carbonic acid input feedstream and/or the carbonic acid stored within the tank is in the range of between approximately 4.3 and 8.2; more preferably between approximately 5 and 8; especially preferably between approximately 5 and 7, for example between approximately 5.5 and 6.5.

Preferably, the pressure of the carbonic acid within the storage tank is in the range of between atmospheric to $4.0 \times 10^5$ pascal (4.0 bar), more preferably between approximately $1.0 \times 10^5$ pascal (1.0 bar) and $4.0 \times 10^5$ pascal (4.0 bar), for example approximately $2.0 \times 10^5$ pascal (2.0 bar).

Preferably, the pressure of the contaminated carbonic acid feedstream is in the range of between $1.0 \times 10^5$ pascal (1.0 bar) and $4.0 \times 10^5$ pascal (4.0 bar), preferably $2.0 \times 10^5$ pascal (2.0 bar).

Preferably, the total dissolved solids (TDS) concentration within the contaminated carbonic acid feedstream is in the range of between approximately 800 to 4200 mg/l.

Preferably, the conductivity of the contaminated carbonic acid feedstream is approximately 1300 to 6500 micro siemens.

Preferably, the pH of the contaminated carbonic acid feedstream is in the range of between approximately 5.5 and 6.5. The pH of the contaminated carbonic acid feedstream is in the range of 8.2 to 9.5.

System 100 is illustrated as comprising a heater element 9a within storage tank 19. It is however to be understood that the system may comprise any suitable heater elements which may be in communication with one or more feedstream(s) and/or the carbonic acid within the storage tank 19. The heater element 9a may be any suitable heater element such as for example an electrical submersion heater. Typically, the heater element is rated at around 6-10 kw. The system 100 comprises a temperature sensor in communication with the PLC to determine the operating temperature of the carbonic acid within the storage tank 19. It is however to be understood that the system 100 may further comprise one or more temperature sensors in communication with the PLC to determine the operating temperature(s) of one or more feedstream(s) and/or the carbonic acid within the storage tank 19. The temperature sensor in the illustrated embodiment is a thermal control device. It is however to be understood that the temperature sensor may be any suitable sensor for determining the operating temperature within the system. The predetermined operating temperature of the carbonic acid within the storage tank is preferably in the range of between 20° C. and 55° C.

Although the illustrated system comprises a monitoring system operable to monitor the pH, pressure and conductivity of the carbonic acid within the storage tank it is to be understood that the monitoring system may be arranged to monitor any number and any combination of suitable operating parameters to determine the effectiveness of the carbonic acid. It is also to be understood that the monitoring system may be arranged to monitor one or more operating parameters of one or more feedstreams at any suitable location within the system. For example, the system may comprise a monitoring system which is operable to determine one or more operating parameters of the carbonic acid feedstream exiting the storage tank 19 and/or the contaminated carbonic acid feedstream exiting the apparatus to be descaled.

Figure 2:
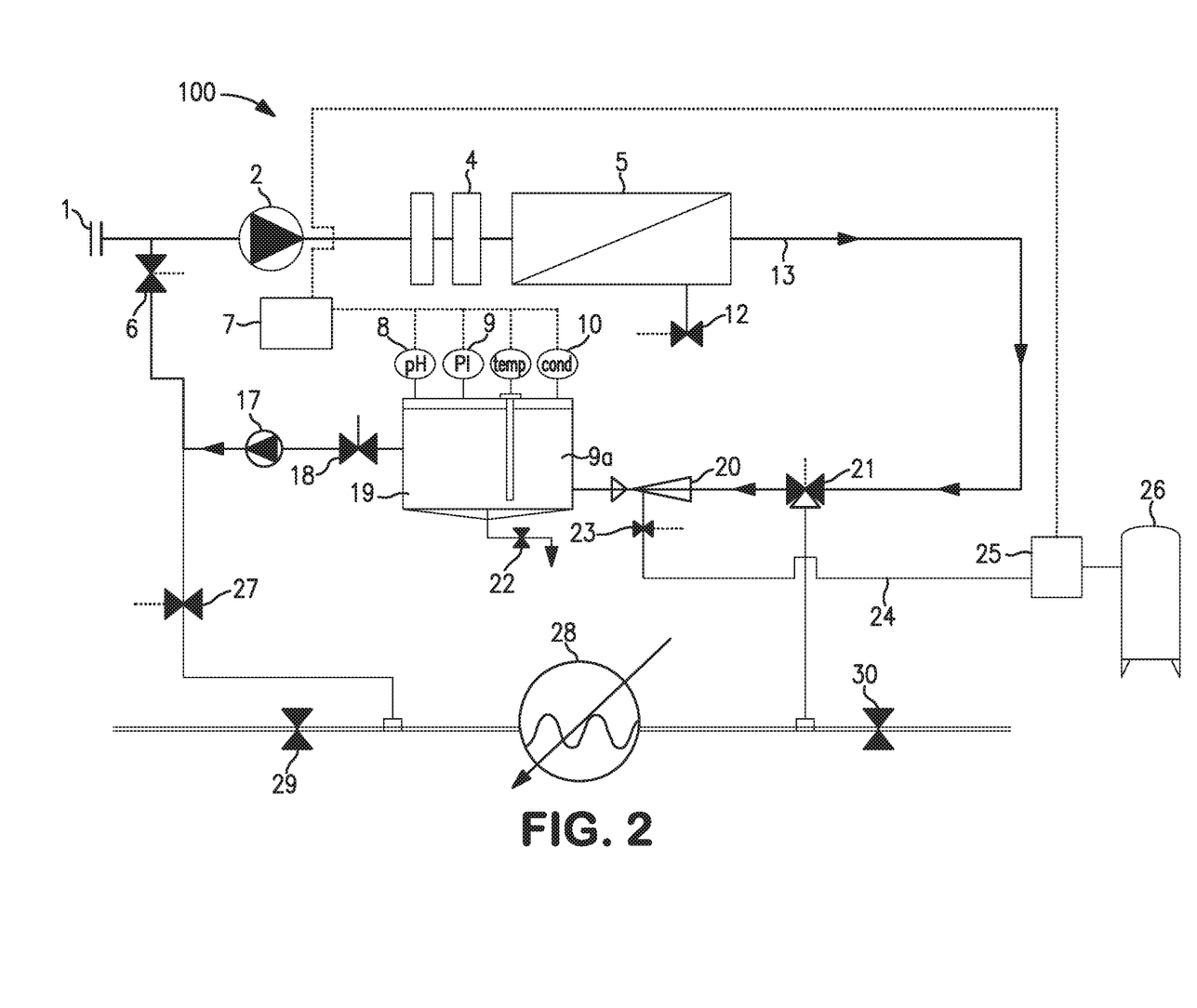
FIG. 2 is a schematic representation of the system of FIG. 1 for de-scaling a heat exchanger.

FIG. 2 illustrates an embodiment of the system of the present invention for descaling an apparatus. When the monitoring system determines that the operating parameters of the carbonic acid is suitable for use as a descaling agent, the carbonic acid injection isolation valve 27 is opened and the carbonic acid feedstream passes into the heat exchanger 28. The carbonic acid feedstream removes scale from the heat exchanger 28 and a contaminated carbonic acid feedstream, containing dissolved scale, exits the heat exchanger 28. The two way valve 21 is opened to allow the contaminated carbonic acid feedstream to be transferred back to the storage tank 19. The contaminated carbonic acid feedstream is therefore recycled back to the storage tank 19.

The monitoring system continues to continually monitor the pH 8, and the values from the pressure sensor 9 and the conductivity probe 10 and these operating parameter values are transmitted back to the PLC. A set of acceptable operating parameters ranges are stored within the PLC. Depending on the values of the operating parameters, the PLC determines whether the operating parameters of the carbonic acid within storage tank 19 are within the acceptable operating parameter ranges. If the operating parameters of the carbonic acid within storage tank 19 are within the acceptable operating parameter ranges the carbonic acid continues to be recycled through to the heat exchanger 28 (and back to the storage tank 19). If however the operating parameters of the carbonic acid within storage tank 19 are found to no longer be within the acceptable operating parameter ranges the PLC may determine that additional pressurised carbon dioxide is required to be fed from the carbon dioxide feedstream 24 into the storage tank via injection valve 23 and gas/liquid contactor 20. The flow of pressurised carbon dioxide feedstream is controlled from a gas dosing panel 25.

The carbonic acid is pumped at least once around the system. The carbonic acid may be pumped more than once, for example continuously, around the system between the storage tank and the heat exchanger until the monitoring system determines that the carbonic acid within the storage tank 19 or a corresponding feedstream needs to be decontaminated. Once the operating parameter(s) has been determined to be outside of the required corresponding predetermined range(s), the carbonic acid injection isolation valve 27 is closed, the recycle isolation valve 6 is opened, and the carbonic acid feedstream is directed into the raw water inlet feedstream 1 and decontaminated through the pre-treatment stages 4 and the RO system 5.

As shown in FIGS. 1 and 2, the heat exchanger 28 is not required to be removed from the process plant during scale removal. The heat exchanger inlet isolation valve 29 and heat exchanged outlet isolation valve 30 are simply closed prior to scale removal. The present invention therefore provides a highly efficient method of scale removal with reduced down time for the production plant during scale removal.

Figure 3:
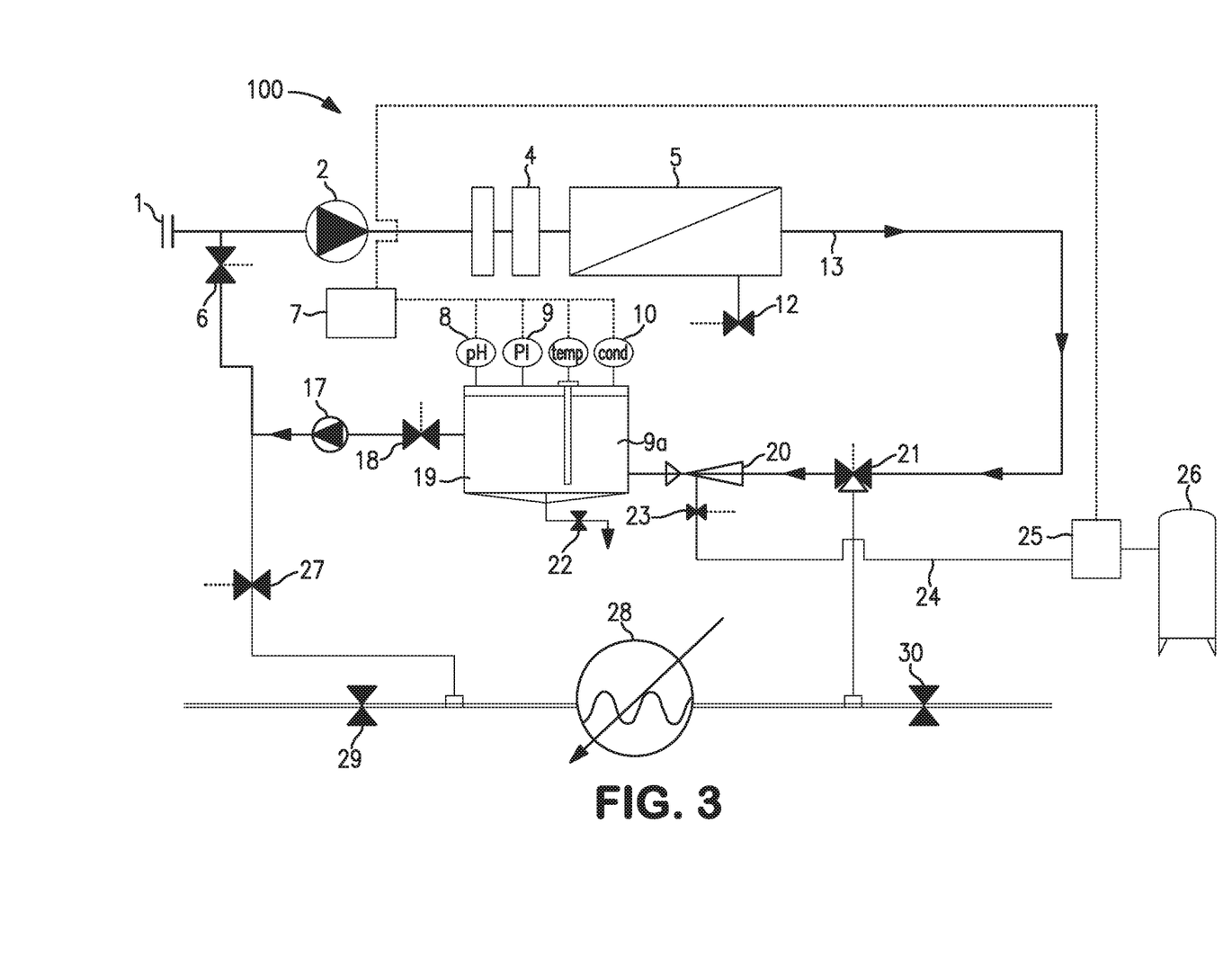
FIG. 3 is a schematic representation of the system of FIG. 1 for reverse osmosis (RO) treatment of contaminated carbonic acid output feedstream.

With reference to FIG. 3, once one or more of the operating parameter(s) of the feedstreams or stored carbonic acid have been determined to be outside of the required predetermined range(s), valve 18 is open and the carbonic acid injection isolation valve 27 is close, the recycle isolation valve 6 is opened, and the carbonic acid feedstream is directed into the raw water inlet feedstream 1 using injection pump 17. The $CO_2$ injection is stopped and injection valve 23 is closed and two way valve 20 would be opened in the flow direction of tank 19. The water pump 2 is operated by PLC 7. The feedstream is decontaminated through optionally the pretreatment stages 4 and the RO system 5.

It is however to be understood that the reject feedstream 12 may be fed directly to a drain without analysis.

The present invention provides a scale removal system and method for removing scale from apparatus which has significantly reduced safety requirements compared to conventional scale removal methods. The system and method of the present invention use a weak acid which has a significantly reduced associated risk of corrosion of the apparatus compared to conventional methods which typically use strong acids such as sulphuric acid. As the present invention uses carbonic acid prepared within the system to removal scale from the apparatus, there is a significantly reduced operator exposure to potentially hazardous chemicals compared to conventional scale removal methods.

Furthermore, the method of the present invention does not produce any hazardous bi-products which require specialist disposal. The system and method of the present invention therefore reduce the cost associated with conventional scale removal methods. The volume of waste products produced by the scale removal method of the present invention are also significantly reduced as the reverse osmosis system can desalinate the contaminated feedstream. The waste water produced by the method of the present invention can be desalinated prior to disposal and then disposed into the local sewer or on site treatment plant.

The present invention can also be used in situ without requiring the apparatus to be removed from the process line prior to scale removal. The present invention therefore provides a highly time efficient method of descaling apparatus with significantly reduced downtime for the production plant during scale removal.

Although illustrative embodiments of the invention have been disclosed in detail herein, with reference to the accompanying drawings, it is understood that the invention is not limited to the precise embodiments shown and that various changes and modifications can be effected therein by one skilled in the art without departing from the scope of the invention as defined by the appended claims and their equivalents. For example, the system may comprise a plurality of apparatus for descaling, arranged either in series or in parallel. The system may comprise a single carbonic acid storage tank, or a plurality of carbonic acid storage tanks. The system may in some embodiments not contain a storage tank.

What I claim is:

1. A method for descaling an apparatus, the method comprising:
    introducing a water inlet feedstream to a reverse osmosis system to generate a water permeate feedstream;
    combining the water permeate feedstream with a pressurised carbon dioxide feedstream to provide a pressurised carbonic acid feedstream in a storage tank;
    recycling at least once the pressurised carbonic acid feedstream from the storage tank through an open carbonic acid injection isolation valve, into and through at least one apparatus for descaling the apparatus, and then back into the storage tank as contaminated carbonic acid feedstream, without passing the pressurised carbonic acid feedstream through a recycle isolation valve that would permit the pressurised carbonic acid feedstream to flow into the water inlet feedstream,
    closing the carbonic acid injection isolation valve and opening the recycle isolation valve to permit the pressurised carbonic acid feedstream to flow through the recycle isolation valve into the water inlet feedstream to be introduced into the reverse osmosis system, and
    closing the recycle isolation valve and opening the carbonic acid injection isolation valve to permit recycling of the pressurised carbonic acid feedstream from the storage tank into and through the at least one apparatus for descaling the apparatus and then back into the storage tank as contaminated carbonic acid feedstream, without passing the pressurised carbonic acid feedstream through the recycle isolation valve that would permit the pressurised carbonic acid feedstream to flow into the water inlet feedstream.

2. The method as claimed in claim 1, in which the pressurised carbon dioxide feedstream combined with the water permeate feedstream is introduced as liquid or compressed gas.

3. The method as claimed in claim 1, in which the at least one apparatus is selected from: heat exchangers and/or condensers.

4. The method as claimed in claim 1, further comprising monitoring at least one operating parameter of one or more feedstreams, in which the at least one operating parameter is selected from the group consisting of: pH, pressure and/or the conductivity, and any combination thereof.

5. The method as claimed in claim 4, comprising the step of monitoring at least one operating parameter of carbonic acid selected from the group consisting of: carbonic acid within the storage tank; the pressurised carbonic acid feedstream, and contaminated carbonic acid feedstream.

6. The method as claimed in claim 4, wherein the carbonic acid feedstream is recycled through the storage tank and the apparatus if operating parameters are determined to be within corresponding predetermined values.

7. The method as claimed in claim 4, in which the pressurised carbonic acid feedstream is introduced to the reverse osmosis system for decontamination when one or more operating parameters of a feedstream or stored carbonic acid is determined to be outside of corresponding predetermined values.

8. The method as claimed in claim 4, further comprising introducing an additional carbon dioxide feedstream into one or more of the carbonic acid within the storage tank; the pressurised carbonic acid feedstream, and the contaminated carbonic acid feedstream, as determined by the monitored operating parameters.

* * * * *